United States Patent
Nachtrab et al.

(10) Patent No.: US 10,706,989 B2
(45) Date of Patent: Jul. 7, 2020

(54) BARRIER LAYER AGAINST MIGRATION OF A SUBSTANCE, ELECTRICAL CONDUCTOR, HOSE, METHOD FOR MANUFACTURING A COATED CABLE OR A COATED HOSE, AND USE OF POLYETHYLENE FURANOATE AS A BARRIER LAYER

(71) Applicant: LEONI kabel GmbH, Nuremberg (DE)

(72) Inventors: Johannes Nachtrab, Windsbach (DE); Erwin Köppendörfer, Schwabach (DE)

(73) Assignee: LEONI Kabel GmbH, Roth (DE)

( * ) Notice: Subject to any disclaimer, the term of this patent is extended or adjusted under 35 U.S.C. 154(b) by 0 days.

(21) Appl. No.: 16/604,191

(22) PCT Filed: Feb. 23, 2018

(86) PCT No.: PCT/DE2018/200014
§ 371 (c)(1),
(2) Date: Oct. 10, 2019

(87) PCT Pub. No.: WO2018/192631
PCT Pub. Date: Oct. 25, 2018

(65) Prior Publication Data
US 2020/0066424 A1 Feb. 27, 2020

(30) Foreign Application Priority Data
Apr. 20, 2017 (DE) .......... 10 2017 108 389

(51) Int. Cl.
*H01B 7/282* (2006.01)
*B29C 48/10* (2019.01)
(Continued)

(52) U.S. Cl.
CPC .......... *H01B 7/2825* (2013.01); *B29C 48/10* (2019.02); *B29C 48/18* (2019.02); *C08L 67/025* (2013.01)

(58) Field of Classification Search
CPC ....... H01B 7/2825; B29C 48/10; B29C 48/18; C08L 67/025; Y02A 30/14
(Continued)

(56) References Cited

U.S. PATENT DOCUMENTS

| 7,087,842 B2 * | 8/2006 | Belli ........... H01B 7/288 174/110 R |
| 2016/0280847 A1 * | 9/2016 | Mussig .......... C08G 63/181 |
| 2017/0334120 A1 | 11/2017 | Siegl |

FOREIGN PATENT DOCUMENTS

| JP | 54-135870 | 10/1979 |
| WO | 2015/066570 | 5/2015 |

(Continued)

OTHER PUBLICATIONS

International Search Report dated Jun. 25, 2018 in PCT/DE2018/200014 with English translation.
(Continued)

*Primary Examiner* — Sherman Ng
(74) *Attorney, Agent, or Firm* — Grüneberg and Myers PLLC

(57) ABSTRACT

A barrier layer is used against migration of a substance, wherein the barrier layer is arranged in a cable and/or around an electrical conductor, and the barrier layer contains polyethylene furanoate or solely contains polyethylene furanoate. Furthermore, an electrical conductor, a cable, and a method are used for manufacturing a coated cable or a coated hose and a use of polyethylene furanoate as a barrier layer.

12 Claims, 1 Drawing Sheet

(51) Int. Cl.
  *B29C 48/18* (2019.01)
  *C08L 67/02* (2006.01)
(58) Field of Classification Search
  USPC .......................................................... 174/107
  See application file for complete search history.

(56) References Cited

FOREIGN PATENT DOCUMENTS

| | | |
|---|---|---|
| WO | 2015/071448 | 5/2015 |
| WO | 2016/044305 | 3/2016 |
| WO | 2016/124403 | 8/2016 |

OTHER PUBLICATIONS

Written Opinion dated Jun. 25, 2018 in PCT/DE2018/200014.
English Translation of International Preliminary Report on Patentability and Written Opinion of the International Search Authority dated Oct. 31, 2019 in PCT/DE2018/200014, 6 pages.

* cited by examiner

BARRIER LAYER AGAINST MIGRATION OF A SUBSTANCE, ELECTRICAL CONDUCTOR, HOSE, METHOD FOR MANUFACTURING A COATED CABLE OR A COATED HOSE, AND USE OF POLYETHYLENE FURANOATE AS A BARRIER LAYER

This application is a National Stage entry under § 371 of International Application No. PCT/DE2018/200014, filed on Feb. 23, 2018, and which claims the benefit of German Application No. 10 2017 108 389.8, filed on Apr. 20, 2017.

BACKGROUND OF THE INVENTION

Field of the Invention

The invention relates to a barrier layer against migration of a substance, wherein the barrier layer is arranged in a cable and/or around an electrical conductor or in a hose. Furthermore, the invention relates to an electrical conductor for transmitting power and/or information, to a cable for transmitting power and/or information, to a hose for conveying a substance, to a method for manufacturing a coated cable or a coated hose by means of an extrusion device, and to the use of polyethylene furanoate as a barrier layer.

Discussion of the Background

Various barrier layers are known for preventing migration of substances into a cable or through a hose into its surroundings. For example, an aluminum layer around an electrical conductor is used in cables in order to prevent atmospheric moisture from penetrating into the electrical conductor. However, such an aluminum layer has the disadvantage that it has to be welded separately in an additional operating step. Above all, aluminum because of its rigid properties causes the electrical conductor and the cable to become inflexible owing to the aluminum layer around the electrical conductor. Consequently, a cable with an aluminum layer as barrier layer can perform only a limited number of flexural fatigue cycles, usually a few thousand flexural fatigue cycles.

Furthermore, fluoropolymers as barrier layers are known. Fluoropolymers however have the drawback that they have a very high melting and hence processing temperature compared with other conventional plastics materials in the manufacture of cables and/or hoses. Since fluoropolymers, compared with the other plastics used, require an excessively high processing temperature, at which the other plastics materials already thermally decompose, a permanent join to the other plastics materials is not produced.

Likewise, barrier layers of polyethylene terephthalate (PET) are known, PET however having only moderate barrier properties with respect to migration and in particular not being suitable for conveying acid-containing substances in hoses.

Because of these drawbacks of the prior art, there is no barrier for different migrating substances such as water, oxygen, carbon dioxide, plasticizers and/or chemical compounds which has a sufficient closed layer against the surrounding medium or medium to be conveyed and secondly itself prevents the migration and also does not adversely affect the flexibility in bending of the coated product.

SUMMARY OF THE INVENTION

The object of the invention is to improve on the prior art.
This object is achieved by a barrier layer against migration of a substance, wherein the barrier layer is arranged in a cable and/or around an electrical conductor or in a hose, and the barrier layer contains polyethylene furanoate or consists of polyethylene furanoate.

By means of a barrier layer which contains polyethylene furanoate (PEF), also referred to as polyethylene dicarboxyfuranoate, or consists of polyethylene furanoate, firstly a closed layer against the surrounding medium or the medium to be conveyed is prevented, and secondly the migration of highly varied substances is prevented by PEF itself.

It is particularly advantageous that the impermeable closed PEF barrier layer is at the same time flexible, so that a cable or a hose can go through a large number of flexural fatigue cycles which is several thousand to several million flexural fatigue cycles.

Above all, PEF represents a barrier to oxygen which is ten times better than PET, a barrier to carbon dioxide which is four times better than PET and a barrier to water which is approximately two times better than PET.

In addition, PEF is a biobased polymer and 100% recyclable.

An essential concept of the invention is based on the fact that by using the polymer polyethylene furanoate (PEF) a closed impermeable barrier layer is provided which nevertheless is simultaneously flexible and thus does not restrict the use of cables and hoses despite their frequent flexural fatigue loading. Furthermore, the conditions of processing PEF are similar to those of standard materials for cable and/or hose manufacturing.

The following concepts are explained:

A "barrier layer" is in particular a layer which as a closed layer has a block against a surrounding medium and/or medium to be conveyed and itself prevents migration of certain substances. A barrier layer in each case protects a contacting other layer, the products and/or constituents located thereunder and/or the environment against harmful influences. A barrier layer may in particular provide prevent protection against environment-related effects, such as for example the penetration of oxygen and/or water into the electrical conductor of a cable, or prevent process-related effects, such as for example the migration of a substance to be conveyed out of a hose into the environment. The barrier layer is in particular made of PEF or contains PEF.

"Migration" is understood to mean in particular the migrating of a substance into and/or through a material, plastics material and/or into the surrounding medium.

A "substance" is in particular a gaseous, liquid and/or solid substance which can migrate through the material and/or the materials of a cable and/or a hose. A substance is in particular water, oxygen, carbon dioxide, plasticizer, chemical compounds and/or chemical mixtures, such as for example hydraulic fluid.

"Cable" designates in particular a single-core or multi-core assembly of cores (individual lines) sheathed with an insulating material or several insulating materials which serves for transmitting power and/or information. A cable may be an electrical or optical cable. In a multi-core cable, in particular the cores used as conductors are sheathed and insulated from each other in each case. A cable may also be a preliminary cable product.

An "electrical conductor" is in particular a medium which has a high density of free-moving charge carriers and as a result possesses good electrical conductivity and also as low as possible an electrical resistance, which makes it suitable for transporting charged particles (electric current). An electrical conductor is in particular an insulated wire or litz wire. A "wire" is in particular a metal of circular cross-section which is formed to be thin, long and/or flexible. A wire may however also be a flat, rectangular or section wire. A wire consists in particular of copper, aluminum or a copper alloy. A "litz wire" is an electrical conductor consisting of thin individual wires, and is in particular readily bendable. A litz wire contains in particular copper. The individual wires of the litz wire are surrounded in particular by a common insulating sleeve (stranded line). If in particular a plurality of stranded lines are combined in one cable, they are called cores. A Litz wire has a thickness of 0.04 mm to 4 mm.

A "core" is in particular an individual line within a bundle of a cable. A core has as conductor material in particular copper, aluminum, silver, steel and/or lead. A core has in particular a thickness of 0.1 mm to 15 mm.

A "hose" is in particular a flexible elongate hollow body with a defined cross-section which has and/or carries a medium in its interior, for example a hydraulic fluid or compressed air. However, various cables can also be carried in a bundle in a hose. A hose may be in particular a corrugated hose, corrugated tube and/or smooth hose.

"Polyethylene furanoate" is a plastics material based on 2,5-furandicarboxylic acid. Reacting 2,5-furandicarboxylic acid with ethylene glycol produces the polyester polyethylene furanoate (PEF), which is also referred to as polyethylene dicarboxylfuranoate. Polyethylene furanoate is a biobased polymer and 100% recyclable. In particular, polyethylene furanoate has a glass transition temperature of 86° C. and a melting temperature of 235° C.

In a further embodiment, the barrier layer is manufactured by extrusion together with a sheath layer in one operation, so that the barrier layer is permanently joined to the sheath layer.

It is particularly advantageous that the barrier layer and the sheath layer are manufactured in the same extruder head of an extruder in a single operation.

Due to the fact that the manufacture takes place in one operation at the same and/or similar temperatures, the barrier layer and the sheath layer during the extrusion are permanently joined, provided that the two lie directly against each other.

Consequently, an additional operating step for applying a barrier layer can be dispensed with. In addition, owing to the permanent joining of the barrier layer with the sheath layer, a closed overall layer is produced, so that for example atmospheric moisture cannot accumulate between the sheath layer and the barrier layer.

"Extrusion" is understood to mean in particular pressing a molding compound through a molding die to form an extruded molded body. Extrusion serves in particular for sheathing and/or coating wires, preliminary cable products, litz wires and/or electrical conductors. In addition, a hose can be manufactured as a molded body by extrusion. The extrusion takes place in particular by means of an extrusion device at a pressure of 10 bar to 1,500 bar and a temperature of 10° C. to 150° C.

A "sheath layer" is in particular a layer externally around a wire, a preliminary cable product, a litz wire and/or a cable. The sheath layer serves in particular for insulating and/or shielding the wire, preliminary cable product or litz wire and/or as a cable sheath for protecting the cable from external influences and/or for shielding purposes. A cable may have an outer sheath layer (the cable sheath itself) and/or one or more inner sheath layers around the respective electrical conductors (wire, litz wire, preliminary cable product). The sheath layer contains in particular plastics materials such as polyolefins, polyurethane, polyvinyl chloride, polystyrenes, polytetrafluoroethylene (PTFE) and/or silicone.

"Permanently joined" is understood to mean in particular that the barrier layer and the sheath layer do not become detached from each other during the entire useful life and/or service life of a cable, electrical conductor and/or hose.

In order to provide a sufficient layer thickness against migration and an application-specific flexibility in bending, the barrier layer has a layer thickness in a range from 0.01 mm to 10 mm, preferably from 0.05 mm to 1 mm.

Thus the PEF barrier layer can be made thinner than a PET barrier layer owing to the better retention properties. Thus, the weight and the material thickness of a cable and/or a hose can be reduced, so that in addition to the better flexibility of the PEF barrier layer per se the flexibility in bending is also improved further by the lesser material thickness of the cable and/or of the hose.

Of course, the PEF barrier layer may also have the same layer thickness as a PET barrier layer, so that as a result a very impermeable and secure migration block is present.

The "layer thickness" is in particular a material thickness of the barrier layer in the radial direction.

In a further embodiment, the barrier layer has a melting temperature of 235° C.

As a result, the PEF barrier layer can be optimally applied by extrusion around an electrical conductor and/or under a sheath layer, and also be permanently joined to the sheath layer.

In a further aspect of the invention, this object is achieved by an electrical conductor for transmitting power and/or information with a barrier layer, wherein the barrier layer contains polyethylene furanoate or consists of polyethylene furanoate and/or is a previously described barrier layer, so that the electrical conductor is protected against migration of a substance and is flexible in bending.

It is particularly advantageous that the electrical conductor is securely protected by the PEF barrier layer against penetration of oxygen, water and/or atmospheric moisture, without thereby losing its flexibility in bending.

In an additional aspect of the invention, this object is achieved by a cable for transmitting power and/or information, wherein the cable has at least one electrical conductor, with a previously described barrier layer and/or a previously described electrical conductor, so that the electrical conductor is protected against migration of a substance and the cable is flexible in bending.

Thus, a cable is also flexible in bending when it has several cores which are protected in each case by their own barrier layer. In addition, the cable may additionally have under the outer cable sheath layer another barrier layer, so that high operational reliability of the cores and hence a long service life of the cable can be achieved by a dual redundancy for each core which is to be protected.

In a further aspect, this object is achieved by a hose for conveying a substance with a barrier layer, wherein the barrier layer contains polyethylene furanoate or consists of polyethylene furanoate and/or is a previously described barrier layer, so that the hose is free from migration of the substance out of its interior into its surroundings and is flexible in bending.

Thus, a medium and/or substance can be conveyed in the interior of the hose without a substance emerging from the interior into the surroundings, in particular the environment. In this case, it is particularly advantageous that the hose remains flexible in bending despite the barrier layer and thus even very long hose lengths can be tightly rolled up and stored.

In an additional aspect of the invention, this object is achieved by a method for manufacturing a coated cable or a coated hose by means of an extrusion device, having the following steps:

introducing a continuous electrical conductor into the extrusion device, and/or extruding a first molding compound to form a sheath layer, and a second molding compound, wherein the second molding compound contains polyethylene furanoate or consists of polyethylene furanoate, to form a barrier layer of the cable or of the hose, and discharging the coated cable or the coated hose, so that the coated cable or the coated hose has a barrier layer and is flexible in bending.

Thus, a method is provided in which the barrier layer and the sheath layer of a cable or a hose are manufactured in one extrusion step.

In order to manufacture the barrier layer and the sheath layer in the same extruder head (die head), the extrusion takes place at a temperature in a range from 210° C. to 270° C., preferably from 230° C. to 240° C.

It is particularly advantageous that in the case of non-miscible plastics materials the simultaneous extrusion achieves a positive connection which leads to an adhesive bond which achieves sufficiently good adhesion between the plastics-material layers.

In addition to the extrusion, also fusing and hence permanent joining of a barrier layer and sheath layer which lie against one another is made possible.

In a further embodiment of the method, upon the extrusion the barrier layer is manufactured as the inner layer and the sheath layer as the outer layer.

As a result, both an outer cable sheath layer with a barrier layer lying directly thereunder or an outer hose sheath layer with a barrier layer lying directly thereunder or a cable sheath layer and, arranged separately therefrom, a barrier layer can be manufactured around the electrical conductor or a plurality of barrier layers can be manufactured around a plurality of electrical conductors.

Consequently, the arrangement of the barrier layer or barrier layers and the sheath aver can be extruded corresponding to the requirements of the manufactured product.

In order to increase the impermeability and to prevent accumulation of undesirable substances between different layers, the barrier layer and the sheath layer are permanently joined by the extrusion.

In a further configuration of the method, the extrusion of the first molding compound and of the second molding compound takes place in one operating step.

Thus, rapid extrusion to form a coated cable or a coated hose and consequently rapid manufacturing which saves on material and energy is made possible.

In an additional aspect of the invention, this object is achieved by a use of polyethylene furanoate as a barrier layer around an electrical conductor and/or in a cable or in a hose, so that the electrical conductor is protected against migration of a substance and is flexible in bending and/or the cable is flexible in bending or the hose is free from migration of the substance out of its interior into its surroundings and is flexible in bending.

BRIEF DESCRIPTION OF DRAWINGS

The invention will be discussed in greater detail below with reference to examples of embodiment. Therein.

DETAILED DESCRIPTION OF THE INVENTION

Figure 1:
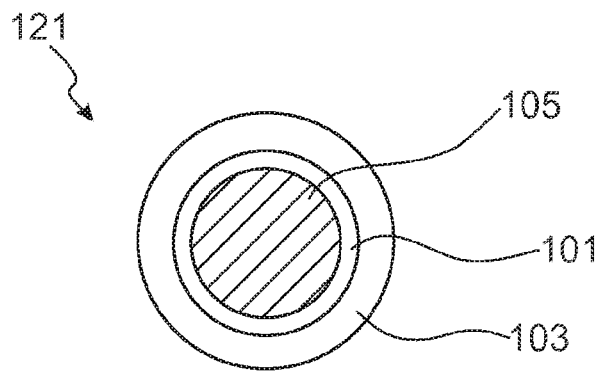
FIG. 1 is a schematic sectional view of a signal line with a polyethylene furanoate layer and an electrical conductor.
Figure 2:
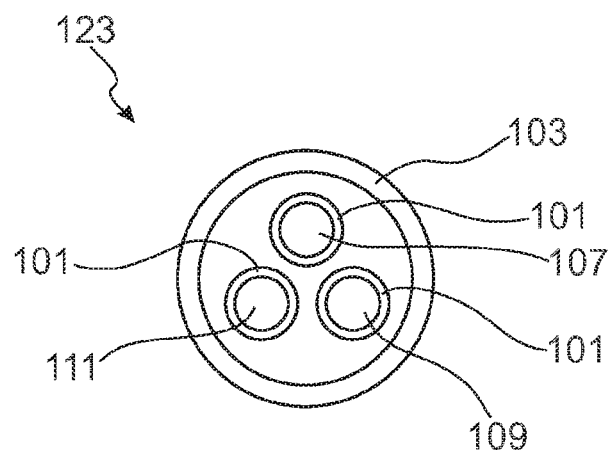
FIG. 2 is a schematic sectional view of an electrical cable with sheath layer and three litz wires with polyethylene furanoate layers.
Figure 3:
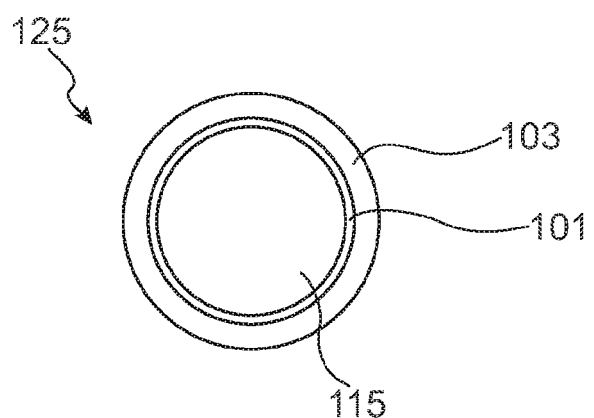
FIG. 3 is a corrugated hose with a sheath layer and polyethylene furanoate layer.

A signal line 121 has in its interior an electrical conductor 105 made of copper and having a diameter of 5 mm. The electrical conductor 105 is surrounded by a polyethylene furanoate layer 101 with a layer thickness of 20 μm. The polyethylene furanoate layer 101 is in turn surrounded directly by a sheath layer 103 of polypropylene with a layer thickness of 1.5 mm. The polyethylene furanoate layer 101 and the sheath layer 103 have been applied to the electrical conductor 105 by extrusion in the same extruder head at 230° C., and as a result are permanently fused together.

An electrical cable 123 has an outer sheath layer 103 and in its interior three litz wires 107, 109 and 111 surrounded by an inner material. The first litz wire 107, the second litz wire 109 and the third litz wire 111 in each case have a diameter of 2 mm and are in each case coated directly with a polyethylene furanoate layer 101. Each of the three litz wires 107, 109 and 111 is protected against penetration of atmospheric moisture, which can migrate through the sheath layer 103 of the electrical cable 123 into the interior of the electrical cable 123, by each polyethylene furanoate layer 101. Because of the flexible polyethylene furanoate layer 101 around each of the three litz wires 107, 109 and 111, the electrical cable 123 itself remains flexible in bending and can be stored and transported on a cable reel with an internal drum diameter of 50 mm.

A corrugated hose 125 has a sheath layer 103 which consists of polypropylene. Beneath the sheath layer 103 there is arranged a melt-joined polyethylene furanoate layer 101. An inner cavity of the corrugated hose 125 is filled with hydraulic fluid 115.

Due to the impermeable and closed polyethylene furanoate layer 101, migration of substances out of the hydraulic fluid 115 through the polyethylene furanoate layer 101 is prevented, so that there is no emergence into the surroundings of the corrugated hose 125.

The corrugated hose 125 is manufactured in an extrusion device with the following operating steps:

Flowable polyethylene (PE) and flowable polyethylene furanoate are pressed at a temperature of 235° C. and a pressure of 300 bar through a molding die, so that the corrugated hose 125 with the outer sheath layer 103 of polyethylene and the internal polyethylene furanoate layer 101 as migration block is manufactured as a molded body.

Due to the fact that the flowable polyethylene and the flowable polyethylene furanoate are pressed simultaneously through the molding die and lie against each other in a molten state in one operating step, the sheath layer 103 of polyethylene and the polyethylene furanoate layer 101 are permanently joined together.

Then the molded and coated hose is discharged from the extruder. The manufactured corrugated hose 125 has a nominal diameter of 25 mm and is wound onto a hose reel with an internal drum diameter of 200 mm. The manufactured corrugated hose 125 is resistant to 100,000 flexural fatigue cycles.

The invention claimed is:

1. A barrier layer against migration of a substance, wherein the barrier layer is arranged in a cable and/or around an electrical conductor, wherein the barrier layer comprises polyethylene furanoate, and wherein the barrier layer is manufactured by extrusion together with a sheath layer in one operation, so that the barrier layer is permanently joined to the sheath layer.

2. The barrier layer according to claim 1, wherein the barrier layer has a layer thickness in a range from 0.01 mm to 10 mm.

3. The barrier layer according to claim 1, wherein the barrier layer has a melting temperature of 235° C.

4. The barrier layer according to claim 1, wherein the barrier layer consists of polyethylene furanoate.

5. The barrier layer according to claim 2, wherein the barrier layer has a layer thickness in a range from 0.05 mm to 1 mm.

6. An electrical conductor for transmitting power and/or information, said electrical conductor comprising: a barrier layer, wherein the barrier layer comprises polyethylene furanoate, so that the electrical conductor is protected against migration of a substance and is flexible in bending, and wherein the barrier layer is manufactured by extrusion together with a sheath layer in one operation, so that the barrier layer is permanently joined to the sheath layer.

7. The electrical conductor according to claim 6, wherein the barrier layer consists of polyethylene furanoate.

8. A method for manufacturing a coated cable by an extrusion device, said method comprising: introducing a continuous electrical conductor into an extrusion device, and extruding a first molding compound to form a sheath layer, and a second molding compound, wherein the second molding compound comprises polyethylene furanoate, to form a barrier layer of a cable, wherein the extrusion of the first molding compound and of the second molding compound takes place in one operation, and discharging the coated cable, so that the coated cable comprises the barrier layer and is flexible in bending.

9. The method according to claim 8, wherein the extrusion takes place at a temperature in a range from 210° C. to 270° C.

10. The method according to claim 8, wherein, upon the extrusion, the barrier layer is manufactured as an inner layer and the sheath layer as an outer layer.

11. The method according to claim 8, wherein second molding compound consists of polyethylene furanoate.

12. The method according to claim 9, wherein the extrusion takes place at a temperature in a range from 230° C. to 240° C.

* * * * *

UNITED STATES PATENT AND TRADEMARK OFFICE
CERTIFICATE OF CORRECTION

PATENT NO. : 10,706,989 B2
APPLICATION NO. : 16/604191
DATED : July 7, 2020
INVENTOR(S) : Johannes Nachtrab et al.

Page 1 of 1

It is certified that error appears in the above-identified patent and that said Letters Patent is hereby corrected as shown below:

On the Title Page

In the left column, item (71) Applicant currently reads:
"LEONI kabel GmbH, Nuremberg (DE)"

And should read:
-- LEONI Kabel GmbH, Roth (DE) --.

Signed and Sealed this
Eighteenth Day of August, 2020

Andrei Iancu
*Director of the United States Patent and Trademark Office*